(12) United States Patent
Cintron et al.

(10) Patent No.: US 6,435,946 B1
(45) Date of Patent: Aug. 20, 2002

(54) TECHNIQUE FOR REDUCING SLIVERS ON OPTICAL COMPONENTS RESULTING FROM FRICTION PROCESSES

(75) Inventors: Orlando Cintron, West Lawn; Donna M. Krepps, Dauberville; Philip Marabella, Sinking Springs, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 95 days.

(21) Appl. No.: 09/611,581

(22) Filed: Jul. 7, 2000

(51) Int. Cl.⁷ .................................................. B24B 1/00
(52) U.S. Cl. .............................. 451/41; 451/54; 451/44
(58) Field of Search ................................ 451/41, 44, 54

(56) References Cited

U.S. PATENT DOCUMENTS

| | | | | |
|---|---|---|---|---|
| 5,855,503 A | * | 1/1999 | Csipkes et al. | 451/278 |
| 5,893,723 A | * | 4/1999 | Yamanaka | 264/272.17 |
| 6,238,278 B1 | * | 5/2001 | Haftmann | 451/278 |
| 6,240,235 B1 | * | 5/2001 | Uno et al. | 385/137 |
| 6,366,726 B1 | * | 4/2002 | Wach et al. | 385/115 |
| 2001/0012429 A1 | * | 8/2001 | Wach et al. | 385/115 |

* cited by examiner

*Primary Examiner*—M. Rachuba
(74) *Attorney, Agent, or Firm*—Steve Mendelsohn

(57) ABSTRACT

During fabrication of components for optical devices, chamfers (or radii) are formed at the edges of the surfaces of the components that are to be subjected to a friction process, such as lapping. After the chamfers are formed, the component is plated, with the plating following the contour of the chamfers. Material is then removed from the surface using a friction process. Because the plating follows the contour of the chamfer, it forms an angle to the lapping stone or wheel used during lapping, where the angle of the plating to the lapping stone is approximately the same as the angle of the chamfer. By providing a chamfer of between about 30 and 60 degrees, and most preferably about 45 degrees, the formation of plating slivers at the edges of the surface during lapping can be significantly reduced, and the occurrence of optical device failures resulting from unwanted particles, such as plating slivers, in cavities within the optical devices is also reduced.

11 Claims, 2 Drawing Sheets

TECHNIQUE FOR REDUCING SLIVERS ON OPTICAL COMPONENTS RESULTING FROM FRICTION PROCESSES

BACKGROUND OF THE INVENTION

1. Field of the Invention

The present invention relates to the fabrication of optical devices for fiber optic communication systems, and, in particular, to a method for reducing plating sliver contamination caused by friction processes during fabrication of such optical devices.

2. Description of the Related Art

In fiber optic communication systems, it is often desirable to block a particular wavelength of light or to have a particular wavelength of light pass through a fiber optic cable. The blocking or passing through of particular wavelengths of light is accomplished using optical devices known as isolators and filters, respectively.

FIG. 1 shows a side view of a conventional optical device 100 that will function as either an isolator or a filter, depending on the selection of device components. Optical device 100 comprises a device body 102 mounted (e.g., welded) between a pair of lens retainers 104 to form a sub-assembly that is itself mounted (e.g., welded) between a pair of Z-sleeves 106. Each Z-sleeve 106 retains and terminates an optical fiber 108; each lens retainer 104 holds a lens; and device body 102 holds either an isolator or a filter that determines whether optical device 100 functions as an optical isolator or as an optical filter. Optical device 100 has four cavities: one between the end of each optical fiber 108 and the lens in the corresponding Z-sleeve 106 and one between each lens and the isolator/filter in the device body 102. For the fiber optic cable to function properly, optical fibers 108 must be precisely aligned within optical device 100 and the cavities must be completely or at least substantially free of unwanted particles.

Lens retainers 104 and Z-sleeves 106 are typically metal components that are plated to protect them from contamination. For example, lens retainers 104 are typically plated with gold plating over nickel plating, while Z-sleeves 106 are typically nickel plated only. To achieve precise alignment and to prevent contamination from the ambient atmosphere, the plated lens retainers 104 and Z-sleeves 106 are subjected, during fabrication, to a friction process (e.g., lapping) to form a flat (i.e., co-planar) surface.

For example, FIG. 2 shows a side view of a conventional lens retainer 104 for the optical device of FIG. 1. According to the prior art, surfaces 202 and 204, which will be mated (e.g., by welding) to corresponding surfaces on body 102 and Z-sleeve 106 of FIG. 1, respectively, are lapped—after plating, but prior to welding—to ensure that the mating surfaces are flat. Unfortunately, slivers (e.g., burrs) of the plating may be left on the surface of the lens retainers after lapping, and these slivers may end up as unwanted particles within the cavities of the optical device. Although most of the slivers can be removed manually, vibration test failure rates are typically greater than 9% due to particle contamination. Also, manually removing plating slivers from the lapped surfaces of lens retainers (and Z-sleeves) increases manufacturing time and cost.

SUMMARY OF THE INVENTION

The present invention is directed to a technique for reducing the occurrence of plating slivers caused by friction processes (e.g., lapping). The inventors have discovered that plating sliver formation is related to the angle of the plating to the lapping stone or wheel used during the lapping process. To prevent plating slivers from forming, components such as lens retainers and Z-sleeves are chamfered or radiused so that the plating forms an angle to the lapping stone of between about 30 degrees and 60 degrees at the edges of the parts. The present invention can reduce the vibration failure rate to less than about 5%. Also, manual inspection and sliver removal can be eliminated, thereby saving time and labor cost.

In one embodiment, the present invention is a method for reducing occurrence of slivers caused by a friction process during manufacture of a component for an optical device having one or more cavities, comprising the steps of (a) removing one or more edges of a surface of the component to form a non-right angle to the surface; and (b) then using a friction process to remove material from the surface to provide a flat surface, whereby the occurrence of slivers on the component resulting from the friction process is reduced as a result of having removed the one or more edges of the surface, thereby decreasing failure rate for the component due to presence of slivers in the one or more cavities of the optical device.

In other embodiments, the present invention is a component or an optical device comprising a component manufactured in accordance with the above method.

In yet another embodiment, the present invention is a component for an optical device having one or more cavities, the component adapted to be mounted within the optical device at a flat surface of the component, wherein the flat surface of the component comprises one or more removed edges that form a non-right angle to the surface in order to reduce occurrence of slivers on the component resulting from a friction process during manufacture of the component, thereby reducing failure rate for the component due to presence of slivers in the one or more cavities of the optical device.

In still another embodiment, the present invention is an optical device comprising the above component.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
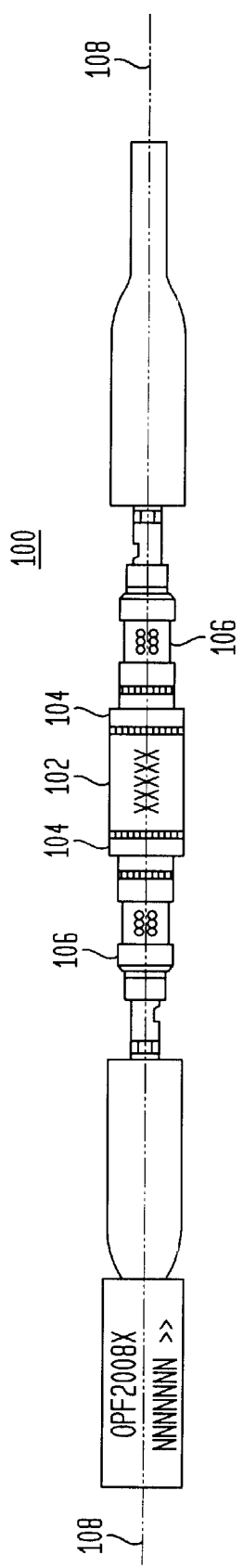
FIG. 1 shows a side view of a conventional optical isolator or filter.
Figure 2:
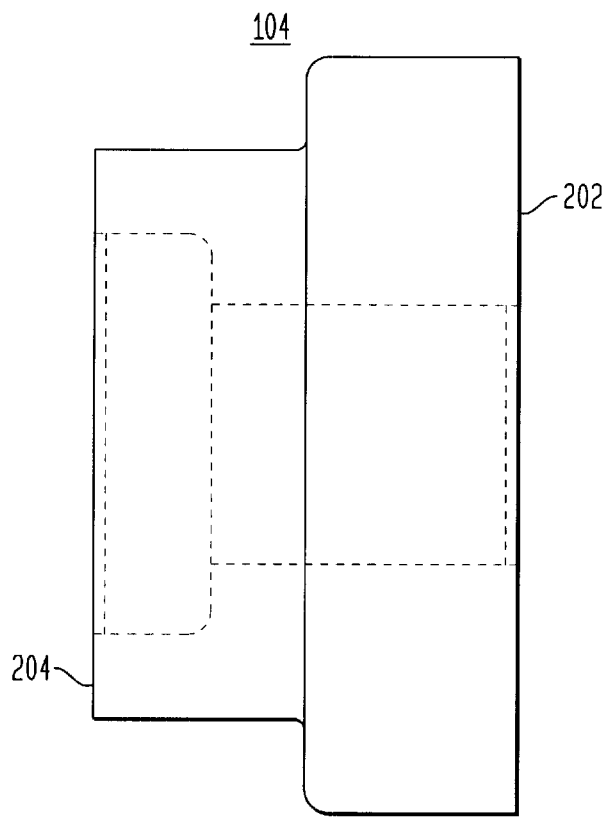
FIG. 2 shows a side view of a conventional lens retainer for the optical device of FIG. 1.
Figure 3:
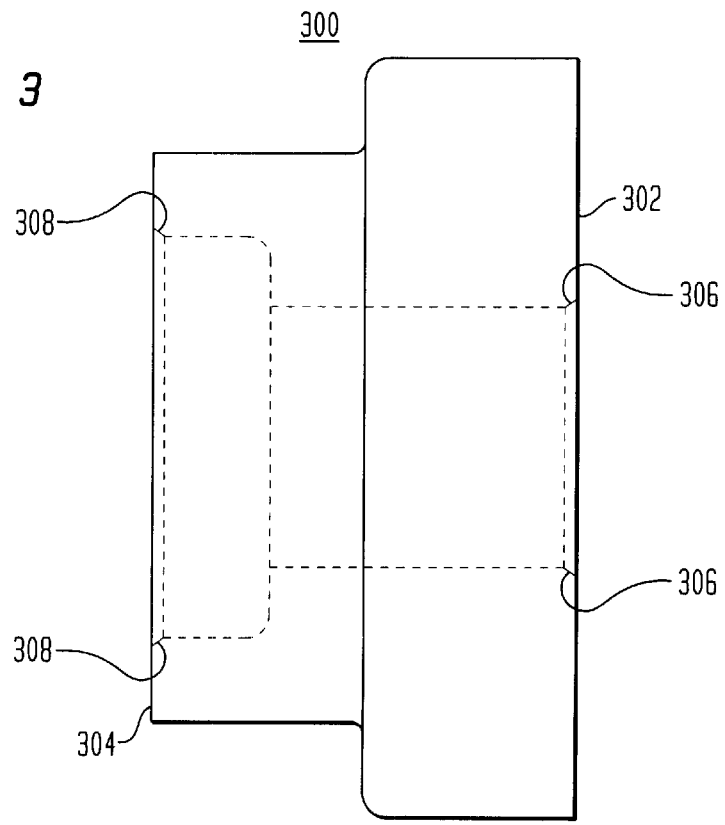
FIG. 3 shows a side view of a lens retainer for use in an optical device, according to one embodiment of the invention.

FIG. 3 shows a side view of a lens retainer 300, according to one embodiment of the present invention, for use in an optical device, such as optical device 100 of FIG. 1. According to this embodiment, inner (diameter) edges 306 and 308 of mating surfaces 302 and 304, respectively, are chambered, preferably prior to plating of the lens retainer. Note that the chamfering shown in FIG. 3 is not necessarily intended to indicate the exact relative size of the chamfering; it is only intended to indicate that some degree of chamfering is performed. In general, each chamfered inner edge forms an angle of between about 30 degrees and 60 degrees with respect to the corresponding mating surface, and preferably of about 45 degrees.

After the part is chamfered, it is plated such that the plating follows the contour of the chamfer.

After plating, material is removed from the mating surface using a friction process, such as lapping. The chamfered edge causes the plating to be at an angle to the top surface of the lapping stone of between about 30 degrees and 60 degrees, and most preferably about 45 degrees. This angle of plating to lapping stone significantly reduces the formation of plating slivers during lapping.

The chamfer is preferably of sufficient size that a partial chamfer is still present after the lapping process is complete, while leaving a substantial portion of the lapped surface flat. For example, if 0.001 inches of material are to be lapped off each mating surface of lens retainer 300, then a chamfer of between about 0.002 and 0.004 inches is preferable. For lens retainers, a gold plating thickness of between about 20 and 90 micro-inches over nickel plating having a thickness of between about 50 and 150 micro-inches is preferable.

Although the present invention has been described in the context of an optical component, such as a lens retainer, having a chamfered edge on its mating surface(s), the present invention can also be implemented using techniques other than chamfering to control the angle between the edge of the plated surface and the lapping stone to reduce the occurrence of plating slivers. For example, instead of chamfering, radii may be formed at the edges of the surfaces to be lapped. Each radius preferably has a sufficient size and is centered such that a partial radius remains at the edge of the lapped surfaces after lapping. Nevertheless, each radius is preferably sufficiently small so that a substantial portion of the lapped surface is flat. For example, if 0.001 inches of material are to be lapped off of a mating surface, then a radius of between about 0.004 and 0.006 inches and centered between about 0.004 and 0.006 inches from the mating surface is preferably formed at the inner edge of that surface.

Although the present invention has been described in the context of lens retainers for optical devices such as isolators and filters, embodiments of the present invention could be designed for other parts, such as the Z-sleeves and device body of optical device 100, and applications other than optical device 100 of FIG. 1, in which plating slivers are detrimental to the performance of the part. As such, the present invention can be applied to other situations in which precision fitting or other considerations necessitate lapping of optical components. Also, the present invention could be applied for processes other than lapping for removing material, such as polishing. In addition, the present invention could be applied to unplated components that are subjected to frictional processes during fabrication of optical devices.

It will be further understood that various changes in the details, materials, and arrangements of the parts which have been described and illustrated in order to explain the nature of this invention may be made by those skilled in the art without departing from the scope of the invention as expressed in the following claims. For example, although the plating described is gold over nickel, the invention can be practiced with other plating compositions. Also, shapes other than chamfers or radii could be formed to provide the desired angle when removing the edges of surfaces to be lapped. Furthermore, in addition to or instead of the inner edges, the outer edges of the mating surfaces could be removed by forming a chamfer, a radius, or the like.

What is claimed is:

1. A method for reducing occurrence of slivers caused by a friction process during manufacture of a component for an optical device having one or more cavities, comprising the steps of:

(a) removing one or more edges of a surface of the component to form a non-right angle to the surface; and (b) then using a friction process to remove material from the surface to provide a flat surface, whereby the occurrence of slivers on the component resulting from the friction process is reduced as a result of having removed the one or more edges of the surface, thereby decreasing failure rate for the component due to presence of slivers in the one or more cavities of the optical device.

2. The invention of claim 1, wherein the angle to the surface is between about 30 and 60 degrees.

3. The invention of claim 2, wherein the angle to the surface is about 45 degrees.

4. The invention of claim 1, wherein the friction process is a lapping process.

5. The invention of claim 1, further comprising the step of plating the component after step (a) and before step (b).

6. The invention of claim 1, wherein step (a) comprises the step of forming a chamfer at an inner edge of the surface.

7. The invention of claim 6, wherein the component retains at least part of each chamfer after the friction process of step (b).

8. The invention of claim 1, wherein step (a) comprises the step of forming a radius at an inner edge of the surface.

9. The invention of claim 8, wherein the component retains at least part of each radius after the friction process of step (b).

10. A component manufactured in accordance with the method of claim 1.

11. An optical device comprising a component manufactured in accordance with the method of claim 1.

* * * * *